Nov. 13, 1951     C. H. GROGAN     2,574,475

APPARATUS FOR CALIBRATING PIEZOELECTRIC CRYSTAL UNITS

Filed Feb. 27, 1946

Inventor

CHARLES H. GROGAN

By M. C. Hayes

Attorney

Patented Nov. 13, 1951

2,574,475

UNITED STATES PATENT OFFICE 2,574,475

APPARATUS FOR CALIBRATING PIEZO-ELECTRIC CRYSTAL UNITS

Charles H. Grogan, West Falls Church, Va.

Application February 27, 1946, Serial No. 650,586

7 Claims. (Cl. 73—4)

(Granted under the act of March 3, 1883, as amended April 30, 1928; 370 O. G. 757)

This invention relates in general to piezoelectric crystal calibrating and more particularly to a method for calibrating a piezoelectric crystal gauge to measure dynamic fluid pressure, and means thereof.

In certain types of work it is desirable to know the value of the voltage that will be developed across the polar faces of a given piezoelectric crystal feeding into a given electrical impedance and subjected to a dynamic fluid pressure of a known value. A crystal so calibrated may then be used as a gauge to measure dynamic fluid pressures such as may be developed in underwater explosions, cylinders of internal combustion engines, and other similar devices in which occur substantially sudden changes of fluid pressure.

There are several types of monoaxial crystals which respond electrically to fluid pressure and are suitable for use in pressure gauges. One of the most satisfactory of these is tourmaline. To increase the sensitivity of the gauge a plurality of crystals, cut into slabs and connected in the proper polarity so as to add their charges, are often used. The electrical faces of the crystals are usually coated with a conducting material to facilitate connecting. The complete assembly may then be molded in soft, resilient rubber to isolate the crystals from the fluid and to provide a convenient supporting means. Such crystal gauges are represented by the tourmaline units #283 and #284 manufactured by the Standolind Gas & Oil Company.

It is also possible to use multiaxial piezoelectric crystals, such as quartz, by properly designing the crystal mountings so as to confine the pressure to one electrically-responsive distortion axis. The #307-A Engine Pressure Indicator manufactured by the Radio Corporation of America is an example of this type of crystal. In the specification herein described, monoaxial crystals such as tourmaline, are used in the preferred embodiment, but it is to be understood that any crystal gauges responsive to fluid pressure may be calibrated in the manner described in the invention.

The e. m. f. applied to an electrical measuring circuit by a piezoelectric crystal is directly proportional to the pressure, the crystal area, and a piezoelectric constant of the crystal. It is inversely proportional to the total capacity of the connecting cable and the amplifier input condenser. The piezoelectric constant of many crystals is accurately known and may be found in the available literature, but the area of the crystal is very difficult to accurately determine. With the invention herein described, it is not necessary to know the above constants. Instead, a pressure relaxation method for calibrating the crystal is used. Two methods of getting an accurate pressure change are described. One method consists of sealing a crystal unit in a system in which the pressure has been raised to a given value, as read on an accurately calibrated Bourdon gauge. The pressure is then suddenly released by puncturing a soft metal disc or diaphragm, such as copper, in a wall of the pressure chamber, by driving a cutter through the disc. The volume of the tank is large enough and the area of the cutting surface small enough so that there is no appreciable pressure increase during the instant of cutting the copper disc. The crystal unit output is then fed through a preamplifier to a cathode-ray oscilloscope where the deflections may be calibrating as desired.

The second method consists of raising the pressure in a closed system, in which has been sealed a crystal unit, until a calibrated soft metal diaphragm, included in the wall of the closed system, ruptures, at which time the rupturing pressure is noted on an accurately calibrated Bourdon gauge or the equivalent.

An object of this invention is to provide a simple and accurate method and a device therefor of calibrating the sensitivity of a piezoelectric crystal gauge with respect to a dynamic fluid pressure.

Other further objects and features of this invention will be apparent from the following specification and drawings, showing only an exemplary embodiment, in which.

Figure 1:
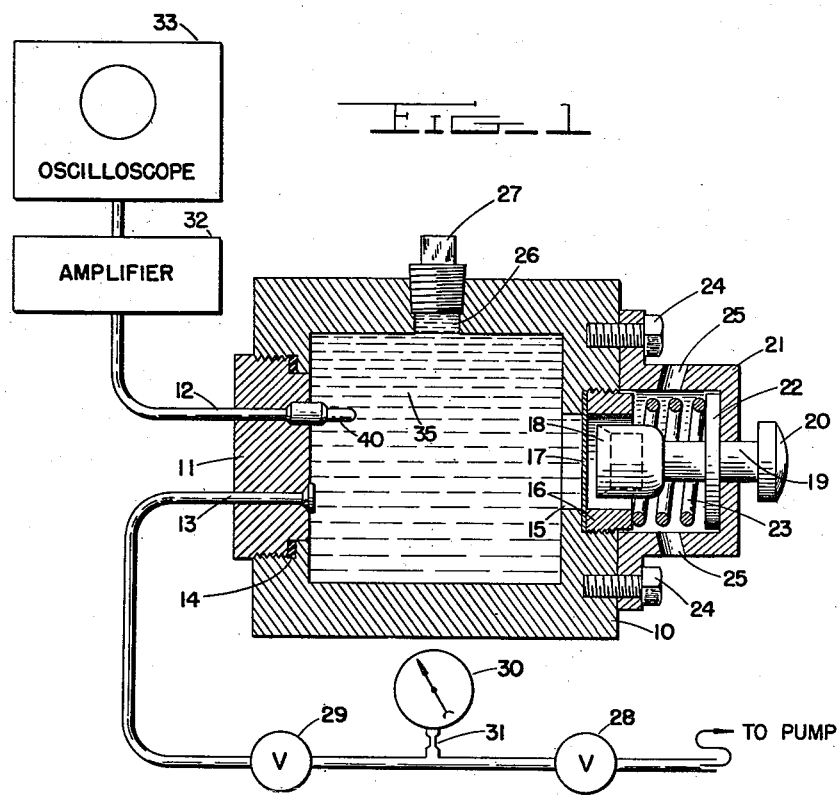
Figure 1 is a cross-sectional view of the pressure chamber, together with the associated pressurizing and indicating means.

Referring now to Figure 1 for a detailed description of the embodiment, container 10 is a tank capable of withstanding the maximum pressure that is likely to be generated therein. Plug 11, containing two holes in which are sealed electrical connector 12 and fluid line 13, is circular and threaded so as to engage similar threads in its receptacle in container 10. Seal ring 14 is a soft, metal ring such as lead, and is used to assure a pressure-seal between container 10 and plug 11. Orifice 15 is a hole in the side of container 10, more conveniently circular, whose outside diameter is substantially larger than its inside diameter for a distance of about one-half the wall thickness. The outside diameter of orifice 15 is threaded to accommodate locking ring 16. In this fashion, a thin, soft metal disc 17, whose diameter is slightly less than the outside diameter of orifice 15 but substantially larger than the inner diameter of said orifice, may be included in the wall of container 10 and pressure-sealed therein by placing it in the outer part of the orifice and screwing clamping ring 16 in against it.

Clamping ring 16 has a hole bored axially therein to accommodate cutter 18, which is conveniently circular and whose diameter is substantially less than the axial hole in clamping ring 16 and the inner diameter of orifice 15. Cutter 18 is mounted axially to shaft 19, which terminates in striking-head 20. Shaft 19 extends through a hole in housing 21 and is operationally mounted and supported thereby. Ring 22 is fixed on shaft 19 about mid-way between the striking-head 20 and the cutter 18 and serves as a flange to engage spring 23, and when in contact with housing 21, as a stop ring for the outward movement of cutter 18. Spring 23 is normally slightly compressed and is axially mounted between ring 22 and clamping ring 16, thus normally maintaining the cutter 18 at a substantial distance from disc 17. Housing 21 is fixed to container 10 with bolts 24 and has drilled therein one or more holes 25 to prevent pressure from being built up within the structure.

A small orifice 26 in the top wall of container 10 and threaded to accommodate pipe cap 27 in a pressure-sealed union, is provided for purposes of bleeding the hydraulic system. Fluid from an appropriate pump or pressure system (not shown) is fed to container 10 through fluid line 13. Valves 28 and 29 are for the purpose of maintaining a given, steady pressure in the testing system and isolating gauge 30, respectively. Pressure snubber 31 is shown as an additional protection for gauge 31 against sudden pressure changes.

The electrical connector 12 is brought out from crystal unit 40, through a pressure-sealed orifice in plug 11, to amplifier 32 and cathode-ray oscilloscope 33 of the indicating system.

Figure 2:
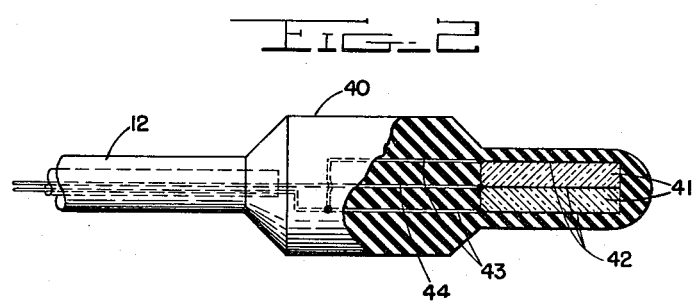
Figure 2 is a drawing, partly broken away, of a typical tourmaline crystal gauge to be calibrated.

Figure 2 is an enlarged view of the crystal unit 40 to be calibrated. The example chosen shows a plurality of tourmaline crystal wafers 41, coated with an electrical conducting material 42 and placed with their electrical faces in contact so that like charges will collect on contacting faces when they are subjected to pressure.

Leads 43 will collect these charges and feed them through cable 12 to the indicating system, as will lead 44 with the charge of the opposite polarity. The complete unit is molded in a soft, resilient rubber housing 40 to provide a convenient mounting means and to isolate the crystal from the fluid.

The embodiment herein described makes possible two methods of obtaining an accurately determinable fluid-pressure change. The first method consists of puncturing the diaphragm 17 with cutter 18, at which time the known fluid pressure in container 10 would be quickly changed to atmospheric pressure and a proportional charge developed across crystal unit 40 would be noted on indicator 33. Practically, it would be necessary to open valve 28 and 29, remove pipe cap 27, and pump a fluid, such as water, into the system until it flowed from orifice 26 indicating that all the air had been driven from the tank. Thus, having bled the system so as to produce a homogeneous pressure medium, pipe cap 27 would be replaced and the pressure increased to any desired value, as indicated on gauge 30. Valve 28 is then closed to maintain a constant pressure, and just before the diaphragm 17 is to be cut, valve 29 should be closed to protect gauge 30. If the volume of the fluid is sufficiently large and the area of the cutter relatively small, there will be no appreciable pressure increase during the instant of cutting. The diaphragm may be cut by striking the striking-head 20 with a sudden blow of the fist, or with a hammer. Air vents 25 are provided so that the pressure inside the container will return to atmospheric pressure as quickly as possible after the disc has been cut. The charge produced on the crystal, as the static fluid pressure is built up to the desired value in the chamber, is discharged very quickly through the input circuit of the amplifier so that there is no initial charge on the crystal unit before diaphragm cutting. Therefore, the indicated deflection on cathode-ray oscilloscope 33 will be due entirely to a dynamic fluid pressure, the value of which is the gauge reading before puncturing. Since the crystal is equally sensitive (within limits) to a positive or negative pressure change, the polarity is of no consequence.

A second method of calibrating the crystal unit is to raise the fluid pressure in container 10 until diaphram 17 ruptures and allows the pressure to very quickly return atmospheric value. By accurately controlling the thickness and composition of the discs themselves, and measuring the pressure at which they rupture on gauge 30, similar discs can be made up and used whenever a calibrating test is desired. This method enables gauges to be quickly calibrated in the field. Construction is greatly simplified by eliminating the cutter equipment.

While the invention herein described has been limited to two embodiments, it is to be clearly understood that the many possible variations which are included in the scope and spirit of the invention are also protected by the claims following herein.

The invention described herein may be manufactured and used by or for the Government of the United States of America for governmental purposes without the payment of any royalties thereon or therefor.

What is claimed is:

1. A fluid-pressure testing device comprising in combination a sealed container, a fluid contained therein and completely filling said container, pressurizing means operable to maintain the fluid in the container at a desired value of pressure, indicating means to determine the fluid pressure in said container, pressure releasing means for substantially instantaneously equalizing the pressure differential between the inside of said container and the medium surrounding said container, means for sealing a piezoelectric crystal to be calibrated inside the container with electrical crystal connector means extending out therefrom, and indicating means operatively connected to said electrical crystal connector means and operatively responsive to electrical charges which may be developed on said crystal.

2. A fluid-pressure testing device comprising in combination a sealed container, a fluid contained therein and completely filling said container, pressurizing means operable to raise the fluid in the container to a desired value of pressure, indicating means to determine the fluid pressure in said container, a membrane included as a part of the wall of said container so as to be subjected to the pressure differential of the container fluid and the medium surrounding the container, means for sealing a piezoelectric crystal to be calibrated inside the container with electrical crystal connector means extending out therefrom, indicating means operatively connected to said electrical crystal connector means and operatively responsive to electrical changes which may be developed on said crystal, and puncturing means for rupturing said membrane, whereby substantially sudden fluid pressure changes in the container may be realized.

3. A fluid-pressure calibrating device comprising in combination a sealed container, a fluid contained therein and completely filling said container, pressurizing means operable to produce a desired pressure differential between the fluid in the container and the medium surrounding the container, indicating means to determine said fluid pressure differential, a membrane of predetermined thickness and composition which is calibrated to rupture at a given pressure, included as a part of the wall of said container so as to be subjected to the pressure differential between the inside and outside of said container, means for sealing a piezoelectric crystal inside the container with electrical crystal connector means extending out therefrom, indicating means operatively connected to said electrical crystal connector means and operatively responsive to electrical charges which may be developed on said crystal.

4. A fluid-pressure testing device comprising in combination a sealed container, a fluid contained therein and completely filling said container, pressurizing means operable to raise the fluid in the container to a desired value of pressure, indicating means to determine the fluid pressure in said container, a membrane included as a part of the wall of said container so as to be subjected to the pressure differential of the container fluid and the medium surrounding the container, means for sealing a piezoelectric crystal to be calibrated inside the container with electrical crystal connector means extending out therefrom adapted to couple said crystal to electrical charge detection means, and puncturing means for rupturing said membrane whereby substantially sudden fluid pressure changes in the container may be realized.

5. A fluid-pressure calibrating device comprising in combination a sealed container completely filled with a fluid at a desired value of pressure, a piezoelectric crystal means sealed within said container having crystal connector leads extending through sealed openings in said container, said leads being adapted to couple said crystal to electrical charge detection means, a portion of the wall of said container comprising a membrane subjected to the pressure differential of the container fluid and the medium surrounding said container, puncturing means for rupturing said membrane held in a stable position under tension opposite said membrane.

6. A fluid-pressure calibrating device comprising in combination a sealed container completely filled with a fluid at a desired value of pressure, a piezoelectric crystal means sealed within said container having crystal connector leads extending through sealed opening in said container, said leads being adapted to couple said crystal to electrical charge detection means, a portion of the wall of said container comprising a membrane subjected to the pressure differential of the container fluid and the medium surrounding said container, puncturing means having a volume substantially less than the volume of fluid within said container located opposite said membrane for puncturing same.

7. A fluid-pressure calibrating device comprising in combination a sealed container completely filled with a fluid at a desired value of pressure, a piezoelectric crystal means sealed within said container having crystal connector leads extending through sealed opening in said container, said leads being adapted to couple said crystal to electrical charge detection means, a portion of the wall of said container comprising a membrane subjected to the pressure differential of the container fluid and the medium surrounding said container, puncturing means having a volume substantially less than the volume of fluid within said container located opposite said membrane for puncturing same, resilient means for holding said puncturing means in position under tension.

CHARLES H. GROGAN.

REFERENCES CITED

The following references are of record in the file of this patent:

UNITED STATES PATENTS

| Number | Name | Date |
| --- | --- | --- |
| 2,393,996 | Layton | Feb. 5, 1946 |
| 2,412,192 | Agnew | Dec. 10, 1946 |

FOREIGN PATENTS

| Number | Country | Date |
| --- | --- | --- |
| 295,256 | Great Britain | July 25, 1929 |